United States Patent
Lee et al.

(10) Patent No.: US 11,556,651 B2
(45) Date of Patent: Jan. 17, 2023

(54) METHOD FOR SECURE BOOTING USING ROUTE SWITCHOVER FUNCTION FOR BOOT MEMORY BUS AND APPARATUS USING THE SAME

(71) Applicant: ELECTRONICS AND TELECOMMUNICATIONS RESEARCH INSTITUTE, Daejeon (KR)

(72) Inventors: Sanghan Lee, Daejeon (KR); Dongwoo Shin, Daejeon (KR); Sangwook Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 183 days.

(21) Appl. No.: 17/089,908

(22) Filed: Nov. 5, 2020

(65) Prior Publication Data
US 2022/0121750 A1 Apr. 21, 2022

(30) Foreign Application Priority Data
Oct. 15, 2020 (KR) .................. 10-2020-0133600

(51) Int. Cl.
*G06F 21/57* (2013.01)
*G06F 9/4401* (2018.01)
*G06F 21/64* (2013.01)

(52) U.S. Cl.
CPC .......... *G06F 21/575* (2013.01); *G06F 9/4406* (2013.01); *G06F 21/572* (2013.01); *G06F 21/64* (2013.01); *G06F 2221/034* (2013.01)

(58) Field of Classification Search
CPC ...... G06F 21/572; G06F 21/57; G06F 21/575; G06F 21/64; G06F 21/86;
(Continued)

(56) References Cited

U.S. PATENT DOCUMENTS 6,489,890 B1 * 12/2002 Inoue .................. G06F 21/86
340/687
9,953,166 B2 4/2018 Newell
(Continued)

FOREIGN PATENT DOCUMENTS

JP 2003186753 A * 7/2003
KR 10-2008-0050216 A 6/2008
(Continued)

*Primary Examiner* — Michael Simitoski
(74) *Attorney, Agent, or Firm* — LRK Patent Law Firm

(57) ABSTRACT

Disclosed herein are a method for secure booting using a route switchover function for a boot memory bus and an apparatus using the same. The method includes maintaining a reset state in order to prevent a processor from being booted, interrupting the connection between the processor and boot memory, verifying the integrity of first boot firmware stored in the boot memory, determining whether hardware damage is detected, and releasing the reset state of the processor and the interrupted state of the connection between the processor and the boot memory in consideration of whether hardware damage is detected and verification of the integrity in order to allow the processor to be booted.

17 Claims, 9 Drawing Sheets

(58) Field of Classification Search
CPC ............ G06F 2221/034; G06F 9/4406; G08B 13/1418; G08B 13/1481; G08B 13/128; G06K 19/07372; G06K 19/07381; H05K 1/0275
See application file for complete search history.

(56) References Cited

U.S. PATENT DOCUMENTS

| | | | |
|---|---|---|---|
| 10,229,271 B2 | 3/2019 | Kim | |
| 10,250,616 B2 | 4/2019 | Ha et al. | |
| 10,902,127 B2 * | 1/2021 | Venkataraman | G06F 21/575 |
| 2001/0011947 A1 * | 8/2001 | Jaber | G08B 13/1418 340/568.4 |
| 2002/0129245 A1 * | 9/2002 | Cassagnol | G06F 21/78 713/168 |
| 2007/0283139 A1 * | 12/2007 | Kato | G06F 9/4401 713/2 |
| 2008/0106366 A1 * | 5/2008 | Zhang | G06F 21/88 340/568.1 |
| 2008/0271145 A1 * | 10/2008 | Schiller | G06F 21/86 726/23 |
| 2009/0072030 A1 * | 3/2009 | Cardone | G07C 13/00 235/386 |
| 2009/0196418 A1 * | 8/2009 | Tkacik | H04L 9/0894 380/46 |
| 2012/0102580 A1 * | 4/2012 | Bealkowski | G06F 21/86 726/34 |
| 2012/0303941 A1 * | 11/2012 | Grieco | G06F 21/575 713/2 |
| 2013/0111600 A1 * | 5/2013 | Guenther | G06F 21/72 726/26 |
| 2013/0157702 A1 * | 6/2013 | Di Luoffo | H04W 40/02 455/500 |
| 2013/0247231 A1 * | 9/2013 | Sibert | H04L 63/0823 726/34 |
| 2015/0012737 A1 * | 1/2015 | Newell | G06F 21/44 713/2 |
| 2016/0055332 A1 * | 2/2016 | Jeansonne | G06F 21/575 726/22 |
| 2016/0063254 A1 * | 3/2016 | Jeansonne | G06F 21/575 713/2 |
| 2016/0125187 A1 * | 5/2016 | Oxford | H04L 63/123 713/2 |
| 2017/0185781 A1 * | 6/2017 | Kim | G06F 8/65 |
| 2018/0157839 A1 * | 6/2018 | Pearson | G06F 21/602 |
| 2018/0165455 A1 * | 6/2018 | Liguori | G06F 21/575 |
| 2018/0349608 A1 * | 12/2018 | de Cesare | G06F 21/575 |
| 2019/0230240 A1 * | 7/2019 | Umimura | G06F 3/1217 |
| 2020/0036519 A1 * | 1/2020 | Bitauld | H04L 9/3263 |
| 2020/0117804 A1 * | 4/2020 | Laffey | H04L 9/0877 |
| 2020/0134232 A1 * | 4/2020 | Nomura | G06F 21/64 |
| 2020/0151336 A1 | 5/2020 | Maletsky et al. | |
| 2020/0183677 A1 | 6/2020 | Hong et al. | |
| 2021/0021422 A1 * | 1/2021 | Schlameuss | H04L 9/0825 |
| 2021/0049310 A1 * | 2/2021 | Grobelny | H04L 9/0825 |
| 2021/0224386 A1 * | 7/2021 | Teglia | G06F 21/554 |
| 2021/0224387 A1 * | 7/2021 | Uragaki | H04N 1/0097 |
| 2021/0225159 A1 * | 7/2021 | Grobelny | G06F 9/4401 |
| 2021/0342065 A1 * | 11/2021 | Chang | G06F 3/0679 |
| 2022/0027474 A1 * | 1/2022 | Street | G06F 21/572 |

FOREIGN PATENT DOCUMENTS

| | | | |
|---|---|---|---|
| KR | 10-2009-0093707 A | 9/2009 | |
| KR | 10-2017-0034203 A | 3/2017 | |
| KR | 10-2017-0078407 A | 7/2017 | |
| KR | 10-2020-0020627 A | 2/2020 | |
| KR | 10-2020-0068345 A | 6/2020 | |
| WO | WO-2007094857 A1 * | 8/2007 | ............ G06F 21/57 |

* cited by examiner

METHOD FOR SECURE BOOTING USING ROUTE SWITCHOVER FUNCTION FOR BOOT MEMORY BUS AND APPARATUS USING THE SAME

CROSS REFERENCE TO RELATED APPLICATION

This application claims the benefit of Korean Patent Application No. 10-2020-0133600, filed Oct. 15, 2020, which is hereby incorporated by reference in its entirety into this application.

BACKGROUND OF THE INVENTION

1. Technical Field

The present invention relates generally to technology for secure booting using a route switchover function for a boot memory bus, and more particularly to technology for fundamentally preventing booting by falsified software in all embedded devices that involve the operation of booting software (including firmware).

2. Description of the Related Art

Most embedded devices including processors are configured to boot software over several steps according to the functions and purposes of the embedded devices. Here, in order to enable such embedded devices to operate normally, software approved by device manufacturers has to be run in the state in which the software has not been tampered with. However, tampering with software by malicious attackers occurs frequently in practice.

Falsified software may incur not only damage to individuals, such as invasion of privacy, economic loss by damage through e-commerce, threats to health (life) by malfunction of medical devices, and the like, but also social/economic/national disasters, such as severe traffic congestion due to malfunction of vehicle control systems, interrupted power supply due to damage to power systems, and the like.

In order to prevent these kinds of damage, various anti-virus (vaccine) programs running in an operating system (OS) environment are present, but when firmware is booted before an OS starts to operate, such anti-virus programs cannot be applied thereto.

As technology for preventing firmware booted before the operation of an OS from being tampered with, there are verified boot technology using a Root of Trust (RoT) and a trusted chain and measured boot technology using a Trusted Platform Module (TPM), which is configured to measure the hash values of all of the software involved in booting and determine whether the software is fault-free by checking whether the measured values match previously designated hash values stored in a remote server. Generally, 'secure boot technology' is an umbrella term that refers to these two technologies.

However, even secure boot technology has a problem in that it is not capable of ensuring the reliability of first run firmware because the secure boot technology does not include a step of checking whether firmware first run by a processor for connection with an RoT (or TPM) has been tampered with. Also, because the firmware first run for the connection with the RoT is dependent on processor hardware technology and because most relevant technologies are proprietary, rather than being open to the public, there is no choice but to use technology of unverified reliability without knowing the content thereof.

The unreliability of the firmware first booted by a processor means that the first boot firmware, which is the start of a chain of trust, may be tampered with or damaged, and that the chain of trust of secure boot technology may also be incapacitated.

Therefore, what is urgently required is new secure boot technology capable of ensuring the reliability of the first firmware booted by a processor.

Documents of Related Art (Patent Document 1) Korean Patent Application Publication No. 10-2020-0020627, published on Feb. 26, 2020 and titled "Secure boot method of IoT device using integrated security SoC"

SUMMARY OF THE INVENTION

An object of the present invention is to provide secure boot technology capable of ensuring the reliability of first boot firmware in an embedded device including a processor by fundamentally preventing damage to a chain of trust arising from falsification of the first boot firmware.

Another object of the present invention is to add only the switchover function of a boot memory bus and a processor reset control step to verified boot technology based on an RoT and a chain of trust, thereby providing secure boot technology capable of being applied in common to different processors regardless of the types thereof because it is simple and is not dependent on technology of processor manufacturers.

A further object of the present invention is to configure a complete chain of trust for all of the software booted in an embedded device by applying secure boot technology, which starts from verification of the integrity of first boot firmware, to all of the software in the embedded device and to prevent software that has been altered for malicious purposes from being booted and executed.

In order to accomplish the above objects, a method for secure booting according to the present invention includes maintaining a reset state in order to prevent a processor from being booted and interrupting connection between the processor and boot memory; verifying the integrity of first boot firmware stored in the boot memory; determining whether hardware damage is detected; and releasing the reset state of the processor and an interrupted state of the connection between the processor and the boot memory in consideration of whether the hardware damage is detected and verification of the integrity in order to allow the processor to be booted.

Here, interrupting the connection may be configured to perform switchover from a route from the boot memory to the processor to a route from the boot memory to a Root-of-Trust (RoT) module for verifying the integrity.

Here, interrupting the connection may be configured to generate a reset control signal for resetting the processor using hardware and to transmit the reset control signal to the processor.

Here, interrupting the connection may be performed when power is applied in order to prevent the processor from booting the first boot firmware.

Here, releasing the reset state and the interrupted state may be performed when verification of the integrity succeeds in a state in which hardware is not damaged, the state being determined based on whether the hardware damage is detected.

Here, releasing the reset state and the interrupted state may be configured to release the reset state of the processor and perform switchover from the route from the boot memory to the RoT module to the route from the boot memory to the processor.

Here, verifying the integrity may include receiving a random number sequence corresponding to an integrity verification result from the RoT module; and determining that verification of the integrity succeeds when the random number sequence matches a random number sequence for verification.

Here, the RoT module may be configured to generate and provide a random number sequence that is identical to the random number sequence for verification when verification of the integrity succeeds; and to generate and provide a random number sequence that is not identical to the random number sequence for verification when verification of the integrity fails.

Here, the random number sequence for verification may be stored in a hardware damage detection module for providing a hardware damage detection signal based on which whether the hardware damage is detected is determined, and may be initialized when it is determined based on the hardware damage detection signal that hardware is damaged.

Here, the RoT module may verify the integrity using a public key for digital signature verification, which is stored in internal OTP memory in which data is not capable of being modified or deleted, a signature value acquired from first boot memory, and a first boot firmware image based on a digital signature verification algorithm.

Here, the RoT module may be securely booted based on its own secure boot mechanism, and may include integrity-checking code in nonvolatile memory fixed based on hardware.

Also, a boot control circuit according to an embodiment of the present invention may include a route switchover device; and control logic for maintaining a reset state in order to prevent the processor of an embedded device from being booted, interrupting connection between the processor and boot memory by controlling the route switchover device, verifying the integrity of first boot firmware stored in the boot memory, determining whether hardware damage is detected, and releasing the reset state of the processor and an interrupted state of the connection between the processor and the boot memory in consideration of whether the hardware damage is detected and verification of the integrity in order to allow the processor to be booted.

Here, the route switchover device may perform switchover from a route from the boot memory to the processor to a route from the boot memory to a Root-of-Trust (RoT) module for verifying the integrity when the connection between the processor and the boot memory is interrupted.

Here, the control logic may generate a reset control signal for resetting the processor using hardware and transmit the reset control signal to the processor.

Here, the control logic may operate when power is applied in order to prevent the processor from booting the first boot firmware.

Here, the control logic may release the reset state and the interrupted state when verification of the integrity succeeds in a state in which hardware is not damaged, the state being determined based on whether the hardware damage is detected.

Here, when the reset state and the interrupted state are released, the reset state of the processor may be released based on the control logic, and switchover from the route from the boot memory to the RoT module to the route from the boot memory to the processor may be performed based on the route switchover device.

Here, the control logic may receive a random number sequence corresponding to an integrity verification result from the RoT module, and may determine that verification of the integrity succeeds when the random number sequence matches a random number sequence for verification.

Here, the RoT module may be configured to generate and provide a random number sequence that is identical to the random number sequence for verification when verification of the integrity succeeds; and to generate and provide a random number sequence that is not identical to the random number sequence for verification when verification of the integrity fails.

Here, the random number sequence for verification may be stored in a hardware damage detection module for providing a hardware damage detection signal based on which whether the hardware damage is detected is determined, and may be initialized when it is determined based on the hardware damage detection signal that hardware is damaged.

Here, the RoT module may verify the integrity using a public key for digital signature verification, which is stored in internal OTP memory in which data is not capable of being modified or deleted, a signature value acquired from first boot memory, and a first boot firmware image based on a digital signature verification algorithm.

Here, the RoT module may be securely booted based on its own secure boot mechanism, and may include integrity-checking code in nonvolatile memory fixed based on hardware.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
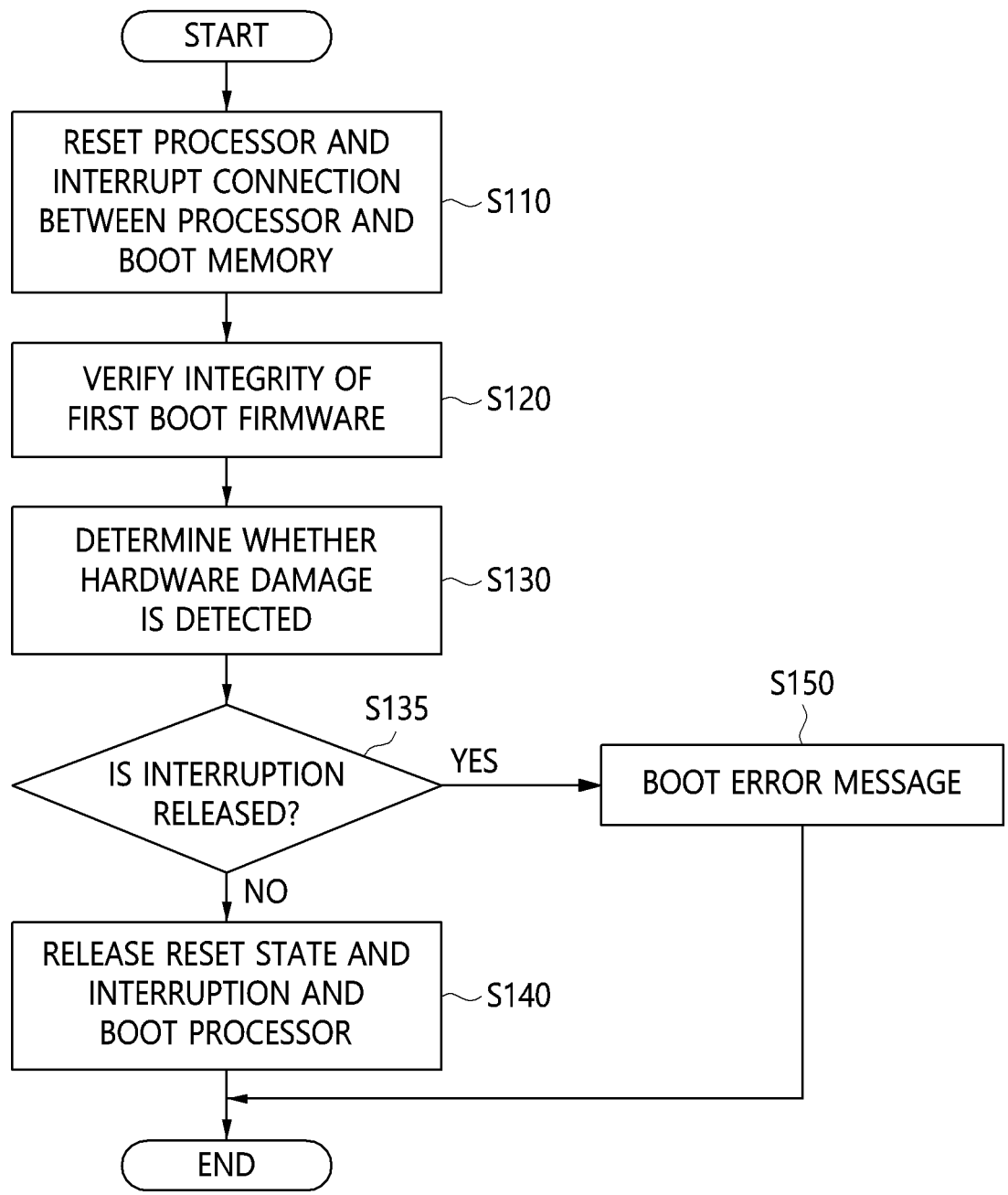
FIG. 1 is a flowchart illustrating a method for secure booting using a route switchover function for a boot memory bus according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

The present invention relates to technology for fundamentally precluding the possibility that boot firmware that is first run by the processor of an embedded device is tampered with. Based on the integrity of the first boot firmware ensured by the technology proposed in the present invention, a chain of trust in the integrity is extended to all of the software in the device involved in booting, whereby the reliability of all of the boot software in the device may be ensured.

Hereinafter, a preferred embodiment of the present invention will be described in detail with reference to the accompanying drawings.

FIG. 1 is a flowchart illustrating a method for secure booting using a route switchover function for a boot memory bus according to an embodiment of the present invention.

In the conventional field of secure booting, technology using a security element, such as a Root of Trust (RoT) or a Trusted Platform Module (TPM), to check whether boot software is tampered with has been proposed, and this technology is widely used by being applied to devices such as PCs, laptops, and the like.

Figure 2:
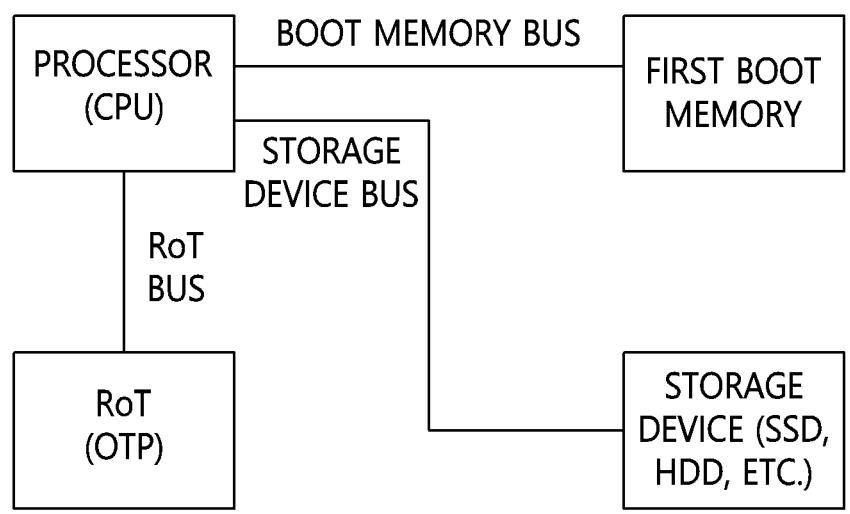
FIG. 2 is a view illustrating the structure of conventional secure boot technology.

FIG. 2 conceptually illustrates a representative example of conventional secure boot technology.

Here, the first boot memory illustrated in FIG. 2 may be memory in which first boot firmware, which is first run to boot a processor (CPU), is stored.

Here, a storage device (an SSD, an HDD, or the like) may be memory that stores boot software of a step after the first boot firmware is run, and various applications and data for operating the device may also be stored therein.

Here, an RoT module, which is a device acting as a root of trust, may store variables required for reliability verification in the internal One-Time Programmable (OTP) memory thereof, and may further provide the function of processing a reliability verification algorithm depending on the circumstances. Here, the variables stored in the OTP memory may be variables that should not be altered in order to verify reliability.

Figure 3:
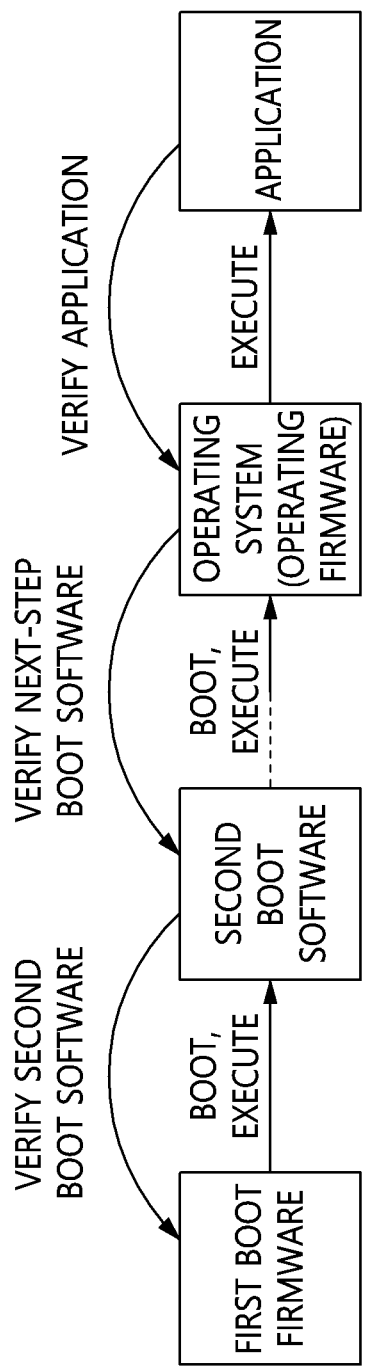
FIG. 3 is a view illustrating an embodiment of operation in conventional secure boot technology.

Here, FIG. 3 illustrates an example of conceptual operation in the conventional secure boot technology based on the structure illustrated in FIG. 2. First, the first boot firmware stored in the first boot memory may verify the integrity of the second boot software before the second boot software stored in the storage device is booted. That is, only when verification of the integrity of the second boot software has succeeded may the second boot software be booted and take control.

Then, the second boot software may verify the integrity of the software to be booted at the next step before the software is booted. That is, only when verification of the integrity of the software to be booted at the next step has succeeded may the software be booted and take control.

Here, the number of pieces of boot software and the number of boot steps may vary in each embedded device, and an operating system (OS) may be booted using the same method as the method described above. In the case of an embedded device having no OS, operating firmware may alternatively be booted.

Finally, the OS may verify the integrity of an application before the application is executed. That is, only when verification of the integrity of the application has succeeded may the application be executed.

Here, integrity verification may be performed through processes such as digital signature verification, verification using a comparison of message digests, and the like, in which case the public key to be used for signature verification and the digest value to be used for verification should not be capable of being altered. That is, when the public key for signature verification or the digest value is capable of being altered, boot software may also be altered.

Therefore, the public key for signature verification and the digest value must be stored in OTP memory, in which it is impossible to change the content, and a storage device for storing such values, which must be prevented from being changed, may be the RoT illustrated in FIG. 2. Such an RoT is the root of trust in secure boot technology, and may be the start point of reliability verification.

Accordingly, in the conventional technology, the RoT module is occasionally included in the first boot firmware as a part thereof. Depending on the circumstances, a separate security device, other than the RoT, is used in order to provide an algorithm-processing function for digital signature verification required for integrity verification or the like.

When an application is run through the above-described method, most pieces of software in an embedded device that are involved in booting and the execution of the application are verified, whereby the reliability of the individual pieces of software in the device may be ensured.

However, the conventional technology shown in FIG. 2 and FIG. 3 does not provide a procedure for verifying the integrity of the first boot firmware. That is, as shown in FIG. 3, after booting, the first boot firmware has to verify the second boot software and to perform the function of connecting with the RoT for verification. This function is implemented in the form of firmware code or software code in the first boot firmware, but there is no process for checking or verifying whether the boot code included in the first boot firmware has been tampered with, as shown in FIG. 3.

This means that the first boot firmware, which is the start point of reliability verification, may be vulnerable to external falsification attacks attempted for malicious purposes and that all of the boot software booted after the first boot firmware may also be exposed to such falsification attacks. In other words, a chain of trust according to the conventional technology may be damaged, and none of the software in an embedded device may be trusted.

Accordingly, some embedded processor manufacturers assert that they have designed their devices to verify first boot firmware by connecting with a hardware RoT module located inside or outside the devices, but there is still a problem in that the integrity of the code for connecting with the RoT and the code for verifying the first boot firmware must be verified. Also, because the manufacturers do not disclose relevant technologies for the reason that such technologies should be protected, it is difficult to verify whether these technologies are actually secure. Also, because a large aspect of these technologies is closely related to processor hardware technology, there is a problem in that secure boot technology for an embedded device is dependent on technology of a processor manufacturer. This may mean that, once the processor to be used in the embedded device is selected, technology related to the processor should be necessarily used even though the security and reliability thereof are not assured.

In order to solve the above-described various problems, the present invention proposes a method for verifying the integrity of the first boot firmware. Particularly, the present invention intends to propose secure boot technology that is relatively simple and more secure but is not dependent on technology of processor manufacturers by adding only a switchover function for a boot memory bus and a reset control function to the conventional secure boot technology.

Referring to FIG. 1, in the secure boot method using a route switchover function for a boot memory bus according to an embodiment of the present invention, a reset state is maintained in order to prevent a processor from being booted, and the connection between the processor and boot memory is interrupted at step S110.

Here, the boot memory may be memory in which first boot firmware is stored. That is, in order to allow the processor to be booted, the first boot firmware stored in the boot memory needs to be booted first, but until verification of the integrity of the first boot firmware is completed, the connection between the processor and the boot memory is interrupted, whereby the processor may be controlled so as not to enter a boot step.

Here, switchover from a route from the boot memory to the processor to a route from the boot memory to a Root-of-Trust (RoT) module, which performs integrity verification, may be performed.

Figure 4:
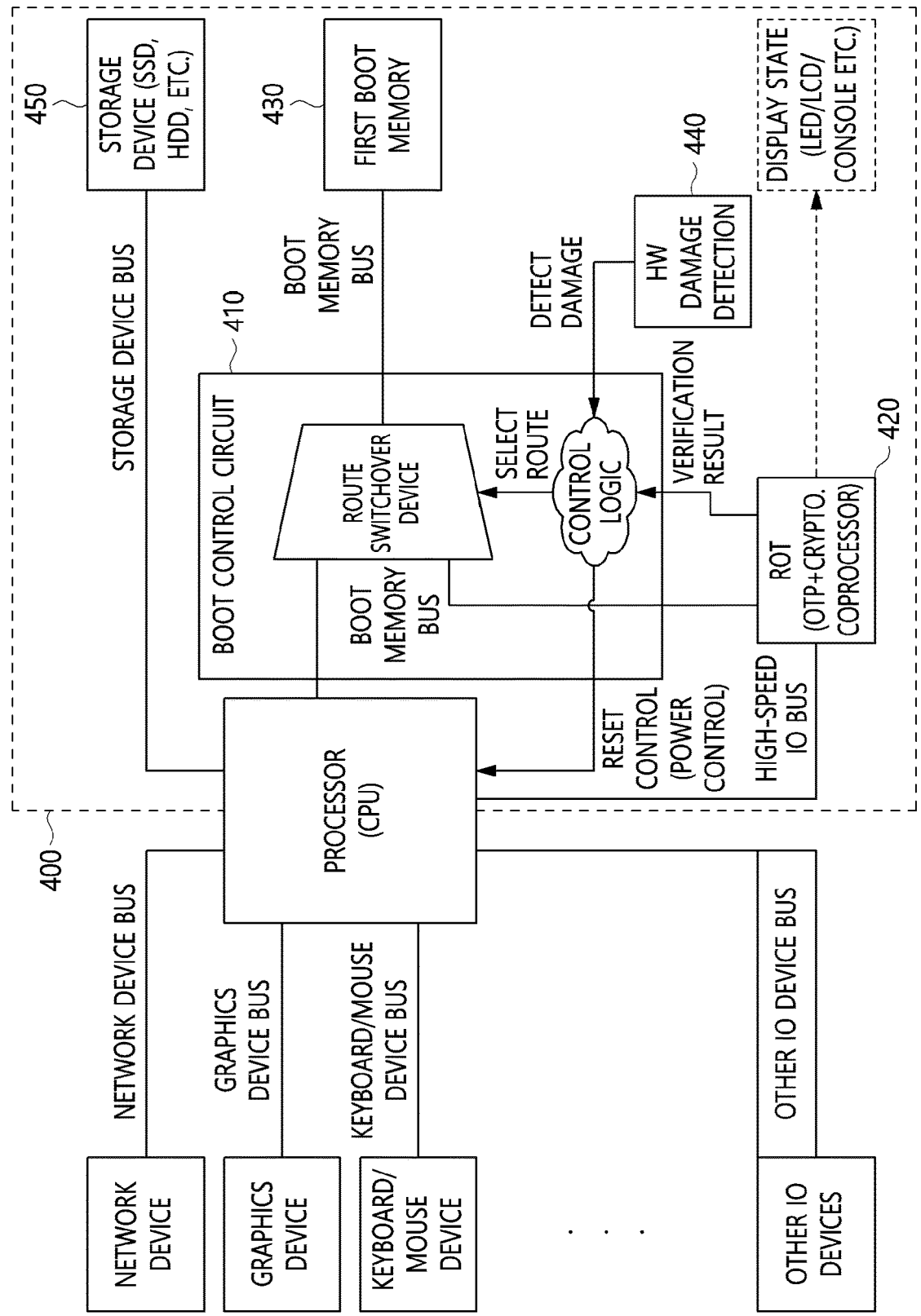
FIG. 4 is a view illustrating the structure of secure boot technology according to an embodiment of the present invention.

For example, FIG. 4 illustrates the internal structure of an embedded device to which secure boot technology according to an embodiment of the present invention is applied, and referring to FIG. 4, it can be seen that the embedded device includes a boot control circuit 410 in which control logic and a route switchover device are embedded.

Here, the boot control circuit 410 controls the route switchover device based on a route selection signal generated in the control logic, thereby connecting the route of the boot memory bus, which is connected to the first boot memory 430, either to the processor or to the RoT module 420. That is, when verification of the integrity of the first boot firmware stored in the first boot memory 430 is not completed, the boot memory bus connecting the processor to the first boot memory 430 is blocked, and then the boot memory bus may connect the first boot memory 430 to the RoT module 420.

Here, a reset control signal for resetting the processor using hardware may be generated and transmitted to the processor.

For example, referring to FIG. 4, the control logic of the boot control circuit 410 may control the reset state of the processor while controlling the route of the boot memory bus using the route switchover device. Here, the control logic generates a reset control signal for resetting the processor using hardware and transmits the same to the processor, thereby controlling the processor so as to continuously maintain the reset state.

Here, when power is applied, step S110 may be performed in order to prevent the processor from booting the first boot firmware.

For example, referring to FIG. 4, immediately when power is applied, the boot control circuit 410 may perform switchover of the route of the boot memory bus such that the first boot memory 430 is connected with the RoT module 420 by controlling the route switchover device based on the control logic, and may simultaneously generate a reset control signal and transmit the same to the processor, thereby controlling the processor so as to be prevented from being booted.

Here, among the various modules illustrated in FIG. 4, the modules included in the region designated by the reference number 400 may be modules directly related to the present invention, that is, modules proposed by the present invention. Also, the remaining modules (a network device, a graphics device, keyboard/mouse devices, and other IO devices), not included in the region designated by the reference number 400, conform to a general embedded device structure, and are modules indirectly related to the present invention. Because these modules are not directly related to the technology of the present invention, a detailed description thereof will be omitted.

The storage device 450 illustrated in FIG. 4 may be memory for storing pieces of boot software to be booted after booting by the first boot firmware stored in the first boot memory 430 is performed, and may store various applications and data required for the operation of the embedded device.

Also, in the secure boot method using a route switchover function for a boot memory bus according to an embodiment of the present invention, the integrity of the first boot firmware stored in the boot memory is verified at step S120.

Here, verification of the integrity may be performed through the Root-of-Trust (RoT) module according to an embodiment of the present invention.

Here, the RoT module may be securely booted based on its own secure boot mechanism, and may include integrity-checking code in nonvolatile memory fixed based on hardware.

Figure 7:
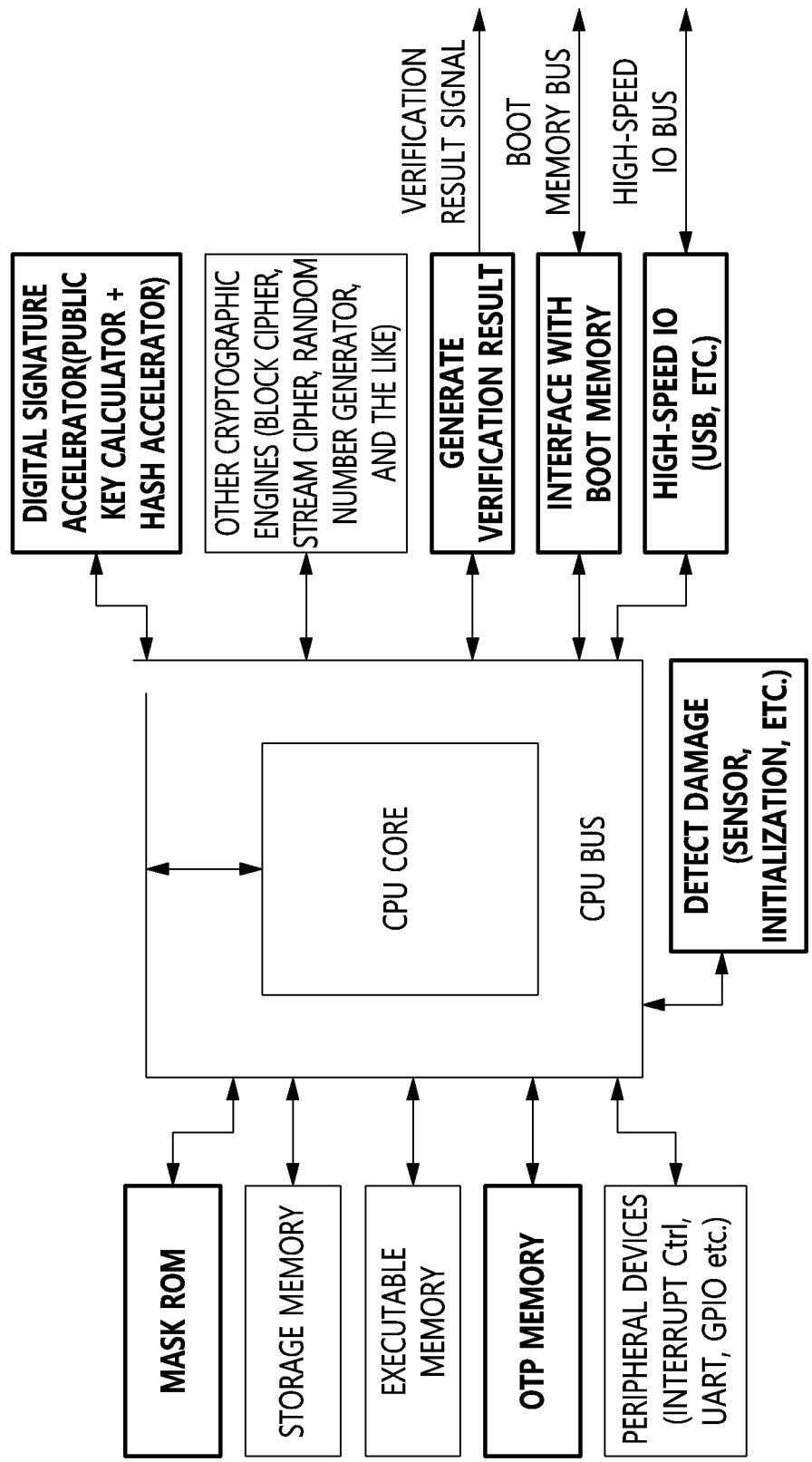
FIG. 7 is a block diagram illustrating the structure of an RoT module according to an embodiment of the present invention.

For example, the RoT module according to an embodiment of the present invention may be a semiconductor chip in SoC form that supports a secure boot function, and may be a dedicated Application-Specific Integrated Circuit (ASIC) or Field-Programmable Gate Array (FPGA) produced through a semiconductor-manufacturing process, or may be a board satisfying the structure illustrated in FIG. 7.

In order to guarantee reliability, this form of RoT module may operate by being securely booted immediately when power is applied to the embedded device, and may verify the integrity of the first boot firmware by executing the integrity-checking code when it is connected with the boot memory based on the switchover of the route of the boot memory bus.

For example, referring to FIG. 4, the RoT module 420 may verify the integrity of the first boot firmware stored in the first boot memory 430 after being connected with the first boot memory 430 through the route switchover function of the boot control circuit 410.

Here, based on a digital signature verification algorithm, the RoT module may perform integrity verification using a public key for digital signature verification, which is stored in the internal OTP memory, in which it is impossible to modify and delete data, a signature value acquired from the first boot memory, and a first boot firmware image.

Such an RoT module may include the function of a cryptographic coprocessor (crypto. coprocessor) for processing a cryptographic algorithm, a reset (power) control function, and a route control function, in addition to the OTP memory function.

For example, the function of the cryptographic coprocessor of the RoT module may natively support a digital signature verification algorithm for integrity verification.

Here, depending on the device, a hash algorithm may be provided in place of the digital signature verification algorithm, and a cryptographic algorithm for hiding sensitive internal information may be supported. The algorithms applied as the hash algorithm and the cryptography algorithm are not limited to specific algorithms.

Also, the RoT module may provide its own secure boot mechanism in order to prevent the firmware thereof from being tampered with.

Here, the boot control circuit 410 illustrated in FIG. 4 may be a board or Field-Programmable Gate Array (FGPA) separate from the RoT module 420, as shown in FIG. 4, or may be embedded in the RoT module 420 as a component thereof.

If the boot control circuit is embedded in the RoT module, because an integrity verification result signal, a route selection signal for controlling the route switchover device, and a reset control signal for controlling the reset state of the processor are not exposed to the outside, manipulation of a signal line to thereby circumvent the function of verifying the first boot firmware is almost impossible. However, when the integrity verification result signal, the route selection signal, the reset control signal, or the like is exposed outside because the boot control circuit 410 is separate from the RoT module 420, as shown in FIG. 4, there is the possibility that the function of verifying the integrity of the first boot firmware is circumvented by manipulating these signals using hardware in order to achieve a malicious purpose.

For example, after an attacker installs falsified boot firmware in the first boot memory 430, when the attacker forces the reset state of the processor to be constantly released and simultaneously manipulates the route selection signal using hardware such that the processor is always connected with the first boot memory 430, the processor may be booted regardless of the result of integrity verification performed by the RoT module 420.

Accordingly, when the boot control circuit 410 is separate from the RoT module 420, as shown in FIG. 4, it is important to configure the boot control circuit 410 such that the inside thereof is not exposed to external attackers. Therefore, the boot control circuit 410 in the form of an FPGA, which does not expose the circuit configuration thereof, may be advantageous, rather than in the form of a board, and even when the boot control circuit 410 is configured as a board, it may take a form capable of protecting the inside thereof using an opaque case, which is difficult to disassemble and open, while preventing the inside thereof from being exposed.

In the present specification, a description will be made on the assumption that the boot control circuit 410 is separate from the RoT module 420.

Meanwhile, even if the boot control circuit 410 illustrated in FIG. 4 is configured such that the inside thereof is hidden, the result of integrity verification performed by the RoT module 420 may be still vulnerable to malicious manipulation.

For example, it may be assumed that, when the integrity verification result signal generated by the RoT module 420 is 'HIGH', this indicates that integrity verification has succeeded. In this case, an attacker manipulates the integrity verification result signal using hardware such that it is set to 'HIGH' all the time, thereby circumventing the function of verifying the integrity of the first boot firmware.

In order to prevent manipulation of the verification result signal in this way, the present invention proposes the following method.

Here, a random number sequence corresponding to the integrity verification result may be received from the RoT module, and when the random number sequence matches a random number sequence for verification, it may be determined that integrity verification succeeds.

Here, when integrity verification succeeds, the RoT module may generate and provide a random number sequence that is identical to the random number sequence for verification, whereas when integrity verification fails, the RoT module may generate and provide a random number sequence that is not identical to the random number sequence for verification.

Figure 5:
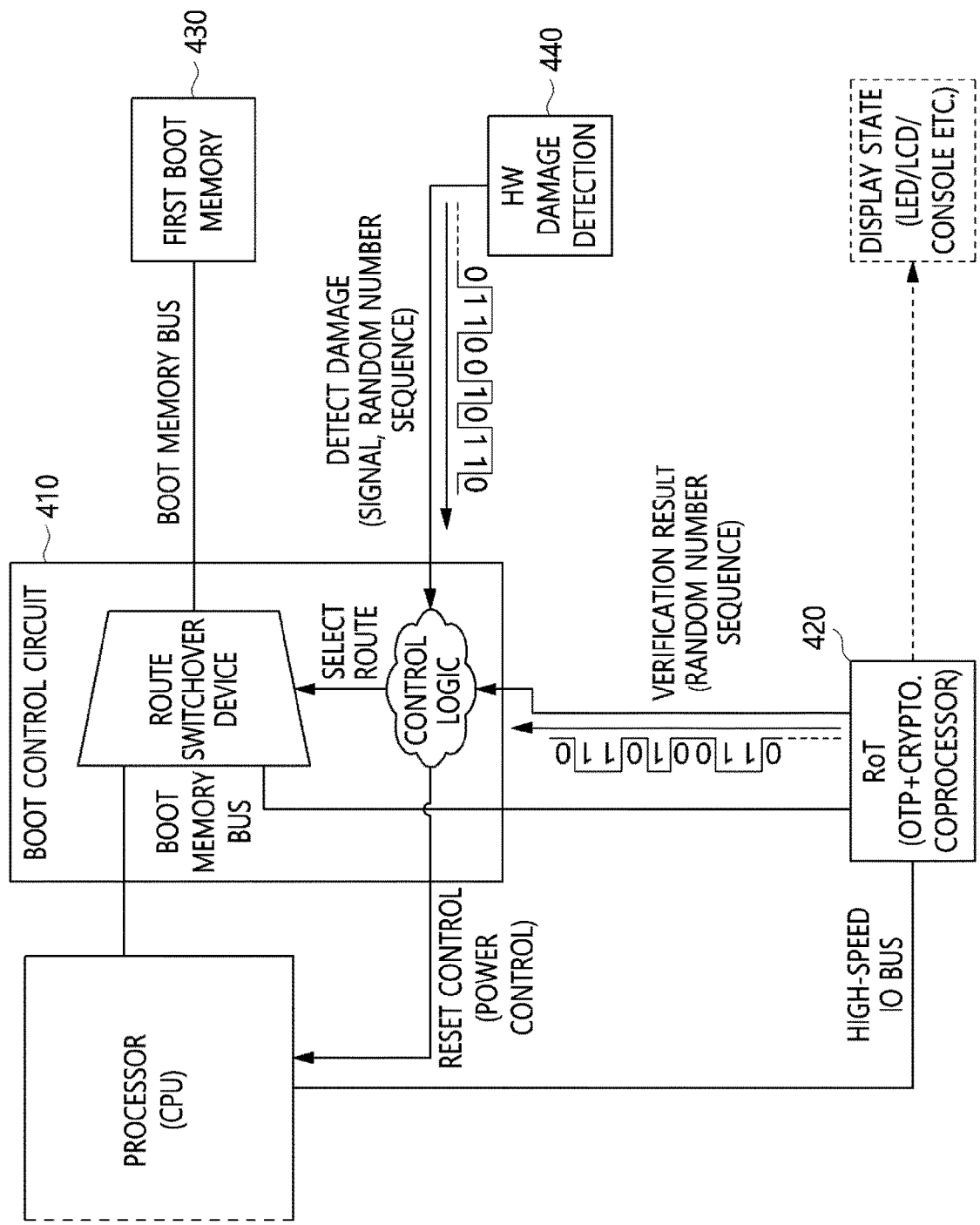
FIG. 5 is a view specifically illustrating a structure for preventing an integrity verification result from being tampered with according to the present invention.

For example, referring to FIG. 5, when verification of the integrity of the first boot firmware stored in the first boot memory 430 succeeds, the RoT module 420 represents an integrity verification result signal using a previously designated random number sequence (a random number sequence that is identical to the random number sequence for verification), rather than 'HIGH', and outputs the same to a verification result signal line, and only when the entirety of the designated random number sequence is input may the control logic of the boot control circuit 410 output a route selection signal and a reset control signal that are set to values for allowing the processor to be booted.

Also, when integrity verification fails, the RoT module 420 may maintain the integrity verification result signal having a value of 'LOW' and output the same to the verification result signal line, or may output a random number sequence that is randomly generated so as to be different from the previously designated random number sequence to the verification result signal line.

Here, the random number sequence data may be a portion of the control logic of the boot control circuit 410, or may be stored in a hardware damage detection module 440 located outside the boot control circuit 410 and read by the control logic when necessary.

As described above, the present invention may be configured such that the RoT module represents an integrity verification result using a previously designated random number sequence and such that the random number sequence to be used for verification is stored in a boot control circuit or a hardware damage detection module, thereby preventing the integrity verification result signal from being manipulated.

Here, the RoT module 420 may notify the user of the embedded device of the fact that the first boot firmware is damaged, and to this end, a state display function using an LED, an LCD, a serial console terminal, or the like may be provided, as shown in FIG. 4.

Also, in the secure boot method using a route switchover function for a boot memory bus according to an embodiment of the present invention, whether hardware damage is detected is determined at step S130.

Here, whether hardware damage is detected may be determined by checking a damage detection signal output by a separate hardware damage detection module.

For example, referring to FIG. 4, the control logic of the boot control circuit 410 may acquire a damage detection signal from a hardware damage detection module 440, and may determine that hardware is damaged when the damage detection signal indicates a damaged state.

Here, the hardware damage detection module 440 may determine whether the embedded device according to the present invention has been illicitly opened or damaged, and may output the determination result using a damage detection signal.

For example, the hardware damage detection module 440 may include a sealed circuit that is set to be damaged when the embedded device is illicitly opened, and when power is applied to the hardware damage detection module 440, the sealed circuit may output a damage detection signal indicating that the device is damaged. Here, the sealed circuit may be designed such that it cannot be easily restored to the original state once it is damaged.

Here, a random number sequence for verification may be stored in the hardware damage detection module, which provides a hardware damage detection signal for determining whether hardware is damaged, and the random number sequence for verification may be initialized when it is determined based on the hardware damage detection signal that the hardware is damaged.

For example, the hardware damage detection module 440 illustrated in FIG. 4 may include a random number sequence storage and initialization circuit for storing a random number sequence for verification, which is a previously designated random number sequence, and initializing the stored random number sequence for verification when illicit opening of the embedded device is detected. This circuit may be configured with data storage memory, a switch and sensor for sensing opening, and the like, and may operate with battery power such that it is capable of operating even when external power is not supplied thereto.

Here, the control logic of the boot control circuit 410 illustrated in FIG. 4 may read the random number sequence for verification from the random number sequence storage and initialization circuit of the hardware damage detection module 440, and may control peripheral modules and circuits such that the processor is booted normally only when the random number sequence received from the RoT module 420 matches the random number sequence for verification.

The hardware damage detection module proposed by the present invention may include various functions in addition to the above-described functions, and the specific internal configuration of the module and embodiments thereof are not limited, as long as the functions of detecting illicit opening of hardware or damage to hardware and outputting the result thereof using a signal are provided.

Also, in the secure boot method using a route switchover function for a boot memory bus according to an embodiment of the present invention, whether to release the reset state of the processor and the interrupted state of the connection between the processor and the boot memory is determined at step S135 based on the integrity verification result and on whether hardware damage is detected, and when it is determined to release the reset state and the interrupted state, the reset state of the processor and the interrupted state of the connection between the processor and the boot memory are released at step S140 such that the processor is allowed to be booted.

Here, step S140 may be performed when integrity verification succeeds in the state in which hardware is not damaged, the state being determined based on whether hardware damage is detected.

Here, the reset state of the processor may be released, and switchover from the route from the boot memory to the RoT module to the route from the boot memory to the processor may be performed.

For example, referring to FIG. 4, the control logic of the boot control circuit 410 may generate a route selection signal to transmit to the route switchover device and a processor reset control signal by referring to the integrity verification result signal output by the RoT module 420 and the damage detection signal output by the hardware damage detection module 440.

Here, when the damage detection signal indicates that there is no damage and when the integrity verification result signal indicates that verification succeeds, a route selection signal for allowing the processor to be connected with the first boot memory 430 may be generated, and the processor may be controlled so as to boot the first boot firmware by releasing the reset state of the processor.

That is, when the integrity verification result signal indicates that verification succeeds but the damage detection signal indicates a damaged state, the route of the boot memory bus may be controlled such that the first boot memory 430 maintains the connection with the RoT module, and the reset state may be maintained through a reset control signal such that the processor is prevented from being booted. Through this process, manipulation of a signal line by illicitly opening hardware may be prevented.

Here, the control logic of the boot control circuit 410 may alternatively generate a power control signal capable of controlling the power supply of the processor. That is, the control logic may allow or prevent booting of the processor by generating a power control signal through which control is performed so as to supply power to the processor or to interrupt the supply of power.

Also, although not illustrated in FIG. 1, in the secure boot method using a route switchover function for a boot memory bus according to an embodiment of the present invention, the reset state and the interrupted state are released, and the processor commences booting of the first boot firmware.

For example, referring to FIG. 4, when the boot control circuit 410 releases the reset state of the processor and connects the boot memory bus of the first boot memory 430 to the processor, the processor may boot the first boot firmware stored in the first boot memory 430.

Then, the processor may boot the boot software of a later step stored in the storage device 450. For example, as in the conventional technology illustrated in FIG. 3, after the boot software of the current step completes verification of the integrity of boot software of the next step, it may boot the boot software of the next step and hand over control thereto.

Here, the processor may process an integrity verification algorithm using the function of the cryptographic coprocessor of the RoT module 420, and to this end, the processor may interface with the RoT module 420 through a high-speed JO bus (USB, SDIO, PCIe, or the like).

Also, in the secure boot method using a route switchover function for a boot memory bus according to an embodiment of the present invention, when it is determined not to release the reset state and the interrupted state at step S135, the reset state of the processor and the interrupted state of the connection between the processor and the boot memory are maintained, and a boot error message may be delivered to a user at step S150.

Here, the boot error message may be provided depending on the integrity verification result and on whether hardware damage is detected.

For example, when integrity verification fails, a boot error message indicating that the first boot firmware is damaged and altered may be output.

In another example, when hardware damage is detected, a boot error message indicating that the boot firmware is altered by hardware access may be output.

Here, a boot error message in any of various forms may be output depending on the circumstances, rather than being limited to any one specific form.

Figure 6:
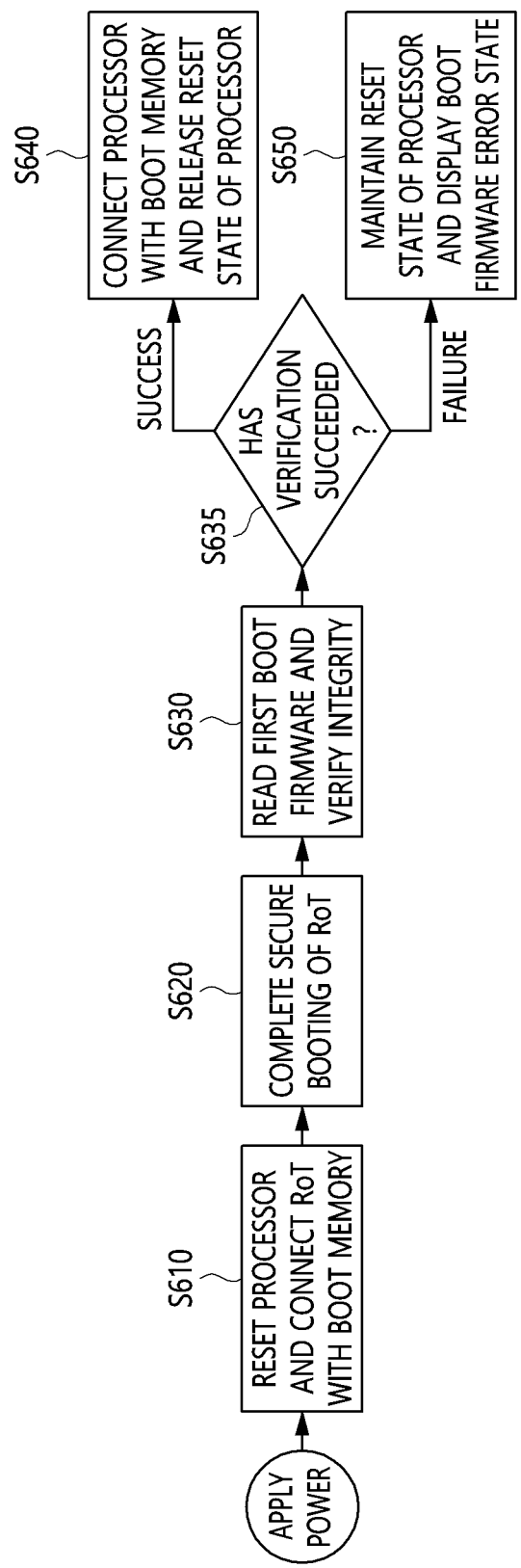
FIG. 6 is a view illustrating an example of an integrity verification process according to the present invention.

Hereinafter, a secure boot process based on integrity verification according to the present invention will be described with reference to FIG. 6.

First, when power is applied, a boot control circuit according to an embodiment of the present invention controls a processor so as not to boot the first boot firmware by resetting the processor, and controls the route of a boot memory bus using a route switchover device such that the first boot memory is connected with an RoT module, thereby configuring the RoT module so as to read the first boot firmware at step S610.

Here, the boot control circuit may interrupt the supply of power to the processor by controlling a power control signal depending on the processor.

Then, the RoT module may complete secure booting thereof based on its own secure boot mechanism at step S620.

Then, the RoT module verifies the integrity of the first boot firmware by reading from the first boot memory at step S630.

Here, the RoT module may verify the integrity using the function of processing a digital signature verification algorithm, a previously stored public key for signature verification, the signature value of the first boot firmware, and a first boot firmware image. Here, the public key for signature verification is stored in OTP memory inside the RoT module, whereby malicious alteration of the public key may be fundamentally prevented. Also, the signature value and image of the first boot firmware may be stored in the first boot memory along with the boot firmware, or may be stored in any nonvolatile memory in the RoT. The public key for signature verification and the signature value may be stored at a device-manufacturing step or a device initial configuration step.

Then, the RoT module may transmit the integrity verification result to the boot control circuit via a verification result signal line.

Here, the RoT module may show the result of verification of the integrity of the first boot firmware to the user of the embedded device using an LED, an LCD, a serial console terminal, or the like.

Then, the boot control circuit checks at step S635 whether integrity verification succeeds. When integrity verification succeeds, the boot control circuit releases the reset state of the processor and sets the route of the boot memory bus such that the processor is connected with the first boot memory, thereby controlling the processor so as to be booted normally at step S640.

Here, the processor may boot the first boot firmware, the integrity of which is verified, by reading the same. Also, the processor may hand over control to the first boot firmware after booting of the first boot firmware is completed.

However, when it is determined at step S635 that integrity verification fails, the reset state of the processor is maintained, and the state in which the route between the processor and the first boot memory is interrupted may be maintained at step S650 so as to prevent the first boot firmware from being booted.

The process described above with reference to FIG. 6 is for describing the integrity verification process in more detail, and although not illustrated in FIG. 6, whether hardware damage is detected may be further considered in order to determine whether to boot the first boot firmware at step S635.

Through the above-described secure boot method using a route switchover function for a boot memory bus, the process of verifying the integrity of the first boot firmware is set as the start point of trust, and trust in integrity is finally extended to applications, whereby reliability of all of the software (including firmware) booted in an embedded device may be guaranteed.

Also, damage to a chain of trust attributable to falsification of the first boot firmware is fundamentally prevented in an embedded device including a processor, whereby secure boot technology capable of ensuring the reliability of the first boot firmware may be provided.

Also, only the switchover function of a boot memory bus and a processor reset control step are added to verified boot technology based on an RoT and a chain of trust, whereby secure boot technology capable of being applied in common to different processors regardless of the types thereof may be provided, because it is simple and is not dependent on technology of a processor manufacturer.

Also, a complete chain of trust for all of the software booted in an embedded device may be built by applying secure boot technology, which starts from verification of the integrity of first boot firmware, to all of the software in the embedded device, and software that has been altered for malicious purposes may be prevented from being booted and executed.

FIG. 7 is a block diagram illustrating the structure of an RoT module according to an embodiment of the present invention.

The function of verifying the integrity of first boot firmware according to the present invention may be provided based on an RoT module configured as shown in FIG. 7.

Here, the RoT module according to an embodiment of the present invention may store information required for digital signature verification in the internal OTP memory thereof, and may provide the function of processing a digital signature verification algorithm as well as processor reset control and control of the route of a boot memory bus.

Referring to FIG. 7, the RoT module according to an embodiment of the present invention may be a semiconductor chip in the form of an SoC that supports a secure boot function.

The RoT module according to an embodiment of the present invention may include mask ROM, OTP memory, a digital signature accelerator, a verification result generation block, a boot memory interface block, a high-speed IO block, and a damage detection block, which are directly related to the present invention, and may also include storage memory, executable memory, peripheral devices, other cryptographic engines, and the like, which conform to a general SoC structure of an embedded device, although not directly related to the present invention.

Hereinafter, detailed components of the RoT module illustrated in FIG. 7 will be described in detail.

First, a CPU core may be a Central Processing Unit (CPU) for controlling and managing the overall operation of the RoT module.

The mask ROM is nonvolatile memory, the content of which is fixed based on hardware at the step of manufacturing the RoT module, and the content of the mask ROM cannot be modified after the RoT module is manufactured. Here, the mask ROM is the space in which boot firmware is stored in the RoT module according to the present invention, and basic configuration code, code for verifying the integrity of the firmware to be booted at the next step, and the like may be included therein.

The storage memory may be a nonvolatile memory space in which the internal software of the RoT module, the signature value of the internal software, various kinds of configuration information, and user data are stored. The software stored in the storage memory may include all of the firmware and software inside the RoT module, excluding the first boot firmware. The storage memory may be configured mainly in the form of NOR (or NAND) flash, and may be alternatively configured as other types of memory depending on the circumstances.

The executable memory is memory in which the firmware code of the RoT module is executed, and may be configured mainly in the form of SRAM, DRAM, or the like. The executable memory may also be configured as other types of memory, such as a cache or the like, depending on the circumstances.

The OTP memory may be a memory space in which, once data is written, the data cannot be modified or deleted. Therefore, the OTP memory may be used as memory for storing a public key for digital signature verification, and public keys stored therein may include a public key for verifying firmware inside the RoT module and a public key for verifying firmware (software) of the embedded device, located outside the RoT module. Here, the number of public keys stored in the OTP memory may vary depending on the number of boot steps.

For example, the OTP memory may store public keys of the types illustrated in Table 1.

TABLE 1

| classification | public key name | description |
| --- | --- | --- |
| for verification of internal firmware | $PK_{INT\_OFW}$ | public key for verifying operating firmware in RoT |
| | $PK_{INT\_AFW}$ | public key for verifying application firmware in RoT |
| for verification of external firmware | $PK_{EXT\_BIOS}$ | public key for verifying BIOS (Basic Input/Output System) firmware of embedded device located outside RoT |
| | $PK_{EXT\_BL}$ | public key for verifying integrity of boot loader of embedded device located outside RoT |
| | $PK_{EXT\_OS}$ | public key for verifying integrity of operating system of embedded device located outside RoT |
| | $PK_{EXT\_APP}$ | public key for verifying integrity of applications of embedded device located outside RoT |

Table 1 illustrates an example, and the number of public keys and a specific embodiment thereof are not limited.

The peripheral devices may be general peripheral devices constituting an SoC, and may include an interrupt controller, a Universal Asynchronous Receiver Transmitter (UART), General-Purpose Input/Output (GPIO), and the like.

The digital signature accelerator may be a component for processing digital signatures and verification functions for verifying the integrity of software (including firmware). The digital signature accelerator according to an embodiment of the present invention may apply a high-speed hardware accelerator in order to reduce a boot time, and may be configured with a hash accelerator and a public key calculator required for digital signatures.

Here, as a digital signature algorithm, a Rivest-Shamir-Adleman (RSA) method, an Elliptic Curve Cryptography (ECC) method, or the like may be used, and in the present invention, the digital signature verification algorithm is not limited to a specific algorithm.

Other cryptographic engines may be cryptographic engines included in a general security chip in the form of an SoC, and may include a block cipher engine, a stream cipher engine, a random number generator, and the like. In the present invention, embodiments of other cryptographic engines are not limited.

The verification result generation block may be a block for generating a result of verification of the integrity of the first boot firmware stored in the first boot memory located outside the RoT module. The verification result generation block according to the present invention may generate a random number sequence that is identical to a previously designated random number sequence for verification. For example, the verification result generation block may be configured in the form of GPIO such that the CPU outputs the random number sequence to GPIO, or may be configured in the form of a pseudo-random number generator so as to output a random number sequence.

The boot memory interface block may be a block for interfacing with the first boot memory located outside the RoT module. Here, the interface function provided by the boot memory interface block may vary depending on the type of boot memory. For example, when the boot memory is Serial Peripheral Interface (SPI) flash memory, an SPI bus interface function may be provided, and when the boot memory is NOR flash memory, a NOR flash memory bus interface function may be provided. In the present invention, the type of boot memory interface function is not limited.

The high-speed Input/Output (TO) block may be a block for providing a high-speed IO interface function such that the CPU core, corresponding to the processor, is capable of using the cipher-processing function of the digital signature accelerator. Here, the high-speed IO interface function may include a Universal Serial Bus (USB), SDIO, PCIe, and the like. The present invention does not limit the type of the high-speed IO interface function.

The damage detection block may be a block for preventing circumvention of an integrity verification function, which is attempted in such a way that an attacker manipulates the internal circuit (an integrity verification result signal or the like) using hardware after disassembling a chip or performing reverse engineering thereon.

For example, the damage detection block may include a damage detection sensor and a damage response circuit.

The damage detection sensor may include sensors for sensing illicit attempts to disassemble/damage a chip, and may include sensors for sensing abnormal behavior performed on the chip, such as an active shield, an optical sensor, a temperature sensor, and the like.

The damage response circuit causes a damage detection interrupt to be sent to the CPU immediately when damage to the chip is detected, and thereby makes the CPU delete the firmware stored in the storage memory or the like in order to prevent the chip from operating.

This damage detection block corresponds to the general configuration and operation concept of technology applied to various existing security chips, and various technologies, other than the above-described embodiment, may also be applied thereto. In the present invention, the specific structure and embodiment of the damage detection block are not limited.

Figure 8:
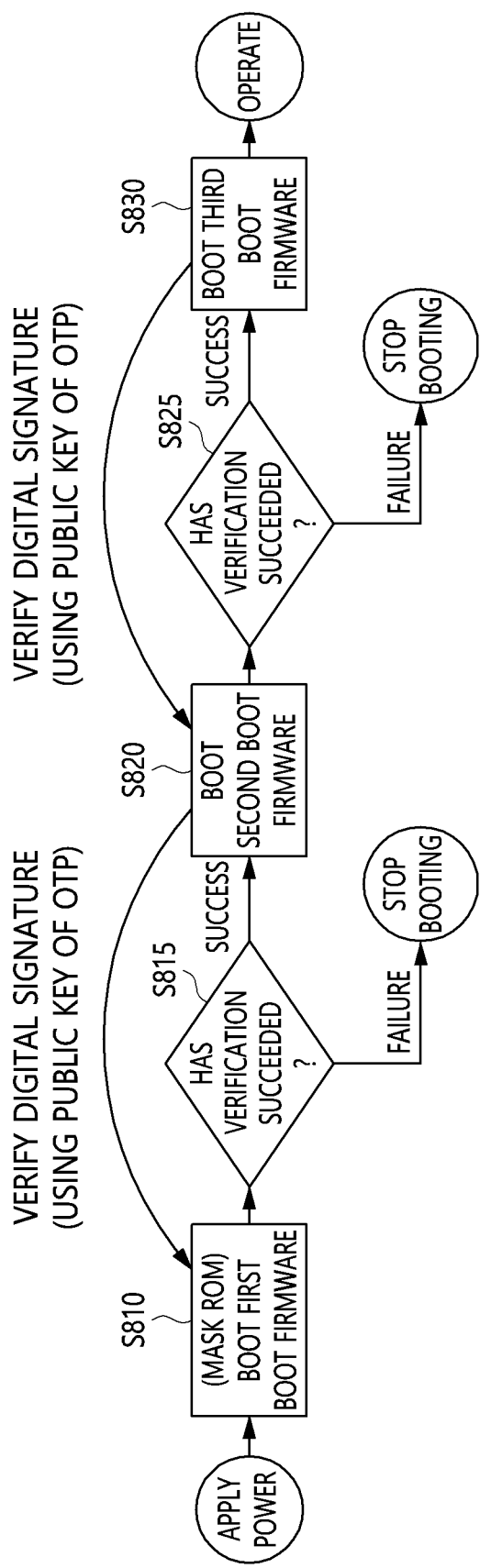
FIG. 8 is a view illustrating an example of a secure boot process of an RoT module according to the present invention.

FIG. 8 is a view illustrating an example of the secure boot process of an RoT module according to the present invention.

Here, FIG. 8 illustrates the secure boot process of an RoT module on the assumption that a boot step includes mask ROM firmware, second boot firmware, and third boot firmware.

Referring to FIG. 8, in the secure boot process of the RoT module according to the present invention, when power is applied, the first RoT boot firmware stored in mask ROM inside the RoT module may be booted at step S810.

Here, the first boot firmware in the mask ROM may perform a digital signature verification operation by reading the second boot firmware. Here, it may be assumed that the public key stored in the OTP memory in the embodiment of the above-described Table 1 is used as the public key for digital signature verification.

Then, whether verification succeeds is determined at step S815, and when verification succeeds, the second boot firmware may be booted at step S820.

Here, when it is determined at step S815 that verification fails, an error message indicating that the second boot firmware is damaged may be output, and booting may be stopped.

When the second boot firmware is booted, the second boot firmware may perform a digital signature verification operation by reading the third boot firmware. Here, it may be assumed that the public key stored in the OTP memory in the embodiment of the above-described Table 1 is used as the public key for digital signature verification.

Then, whether verification succeeds is determined at step S825, and when verification succeeds, the third boot firmware may be booted at step S830.

Here, when it is determined at step S825 that verification fails, an error message indicating that the third boot firmware is damaged may be output, and booting may be stopped.

When the third boot firmware is booted, the RoT module may complete booting and preparation for operation, and may perform defined functions in response to requests from external devices.

Figure 9:
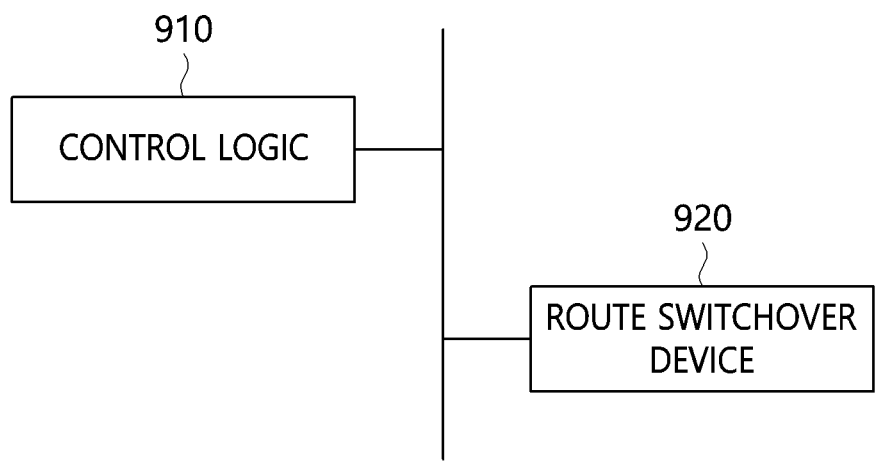
FIG. 9 is a block diagram illustrating a boot control circuit using a route switchover function for a boot memory bus according to an embodiment of the present invention.

FIG. 9 is a block diagram illustrating a boot control circuit using a route switchover function for a boot memory bus according to an embodiment of the present invention.

Referring to FIG. 9, the boot control circuit using a route switchover function for a boot memory bus according to an embodiment of the present invention includes control logic 910 and a route switchover device 920.

The control logic 910 maintains a reset state such that the processor of an embedded device is not booted, and interrupts the connection between the processor and boot memory.

Here, the boot memory may be memory in which the first boot firmware is stored. That is, in order to allow the processor to be booted, the first boot firmware stored in the boot memory needs to be booted first, but until verification of the integrity of the first boot firmware is completed, the connection between the processor and the boot memory is interrupted, whereby the processor may be controlled so as not to enter a boot step.

Here, when the connection between the processor and the boot memory is interrupted, the route switchover device 920 may perform switchover from the route from the boot memory to the processor to a route from the boot memory to a Root-of-Trust (RoT) module for performing integrity verification.

For example, FIG. 4 illustrates the internal structure of an embedded device to which secure boot technology according to an embodiment of the present invention is applied, and referring to FIG. 4, it can be seen that the embedded device includes a boot control circuit 410 in which control logic and a route switchover device are embedded.

Here, the boot control circuit 410 controls the route switchover device based on a route selection signal generated in the control logic, thereby connecting the route of the boot memory bus, which is connected to the first boot memory 430, either to the processor or to the RoT module 420. That is, when verification of the integrity of the first boot firmware stored in the first boot memory 430 is not completed, the boot memory bus connecting the processor to the first boot memory 430 is blocked, and then the boot memory bus may connect the first boot memory 430 to the RoT module 420.

Here, the control logic 910 may generate a reset control signal for resetting the processor using hardware and transmit the same to the processor.

For example, referring to FIG. 4, the control logic of the boot control circuit 410 may control the reset state of the processor while controlling the route of the boot memory bus using the route switchover device. Here, the control logic generates a reset control signal for resetting the processor using hardware and transmits the same to the processor, thereby controlling the processor to continuously maintain the reset state.

Here, when power is applied, the control logic 910 may operate in order to prevent the processor from booting the first boot firmware.

For example, referring to FIG. 4, the boot control circuit 410 may perform switchover of the route of the boot memory bus such that the first boot memory 430 is connected to the RoT module 420 by controlling the route switchover device based on the control logic immediately when power is applied, and may simultaneously generate a reset control signal and transmit the same to the processor, thereby performing control such that the processor is prevented from being booted.

Here, among the various modules illustrated in FIG. 4, the modules included in the region designated by the reference number 400 may be modules directly related to the present invention, that is, modules proposed by the present invention. Also, the remaining modules (a network device, a graphics device, keyboard/mouse devices, and other IO devices) not included in the region designated by the reference number 400 conform to a general embedded device structure and are modules indirectly related to the present invention. Because these modules are not directly related to the technology of the present invention, a detailed description thereof will be omitted.

The storage device 450 illustrated in FIG. 4 may be memory for storing the boot software to be booted after booting by the first boot firmware stored in the first boot memory 430 is performed, and may store various applications and data required for the operation of the embedded device.

Also, the control logic 910 verifies the integrity of the first boot firmware stored in the boot memory.

Here, verification of the integrity may be performed through the Root-of-Trust (RoT) module according to an embodiment of the present invention.

Here, the RoT module is securely booted based on its own secure boot mechanism, and may include integrity-checking code in nonvolatile memory fixed based on hardware.

For example, the RoT module according to an embodiment of the present invention may be a semiconductor chip in the form of an SoC that supports a secure boot function, and may be a dedicated Application-Specific Integrated Circuit (ASIC) or Field-Programmable Gate Array (FPGA) produced through a semiconductor-manufacturing process, or a board satisfying the structure illustrated in FIG. 7.

In order to ensure reliability, this form of the RoT module may operate by being securely booted when power is applied to the embedded device, and may verify the integrity of the first boot firmware by executing the integrity-checking code when it is connected with the boot memory based on the switchover of the route of the boot memory bus.

For example, referring to FIG. 4, the RoT module 420 may verify the integrity of the first boot firmware stored in the first boot memory 430 after being connected with the first boot memory 430 through the route switchover function of the boot control circuit 410.

Here, based on a digital signature verification algorithm, the RoT module may perform integrity verification using a public key for digital signature verification, which is stored in the internal OTP memory, in which it is impossible to modify and delete data, a signature value acquired from the first boot memory, and a first boot firmware image.

Such an RoT module may include the function of a cryptographic coprocessor (crypto. coprocessor) for processing a cryptographic algorithm, a reset (power) control function, and a route control function, in addition to the OTP memory function.

For example, the function of the cryptographic coprocessor of the RoT module may natively support a digital signature verification algorithm for integrity verification. Here, depending on the device, a hash algorithm may be provided in place of the digital signature verification algorithm, and a cryptographic algorithm for hiding sensitive internal information may be supported. The algorithms applied as the hash algorithm and the cryptography algorithm are not limited to specific algorithms.

Also, the RoT module may provide its own secure boot mechanism in order to prevent the firmware thereof from being tampered with.

Here, the boot control circuit 410 illustrated in FIG. 4 may be a board or Field-Programmable Gate Array (FGPA) separate from the RoT module 420, as shown in FIG. 4, or may be embedded in the RoT module 420 as a component thereof.

If the boot control circuit is embedded in the RoT module, because an integrity verification result signal, a route selection signal for controlling the route switchover device, and a reset control signal for controlling the reset state of the processor are not exposed to the outside, manipulation of a signal line to thereby circumvent the function of validating the first boot firmware is almost impossible. However, when the integrity verification result signal, the route selection signal, the reset control signal, or the like is exposed outside because the boot control circuit 410 is separate from the RoT module 420, as shown in FIG. 4, there is the possibility that the function of verifying the integrity of the first boot firmware is circumvented by manipulating these signals using hardware for a malicious purpose.

For example, after an attacker installs falsified boot firmware in the first boot memory 430, when the attacker forces the reset state of the processor to be constantly released and simultaneously manipulates the route selection signal using hardware such that the processor is always connected with the first boot memory 430, the processor may be booted regardless of the result of integrity verification performed by the RoT module 420.

Accordingly, when the boot control circuit 410 is separate from the RoT module 420, as shown in FIG. 4, it is important to configure the boot control circuit 410 such that the inside thereof is not exposed to external attackers. To this end, it may be more advantageous for the boot control circuit 410 to take the form of an FPGA, which does not expose the circuit configuration thereof, than to take the form of a board, and even when the boot control circuit 410 is configured as a board, it may take a form capable of protecting the inside thereof using an opaque case, which is difficult to disassemble and open, while preventing the inside thereof from being exposed.

In the present specification, a description will be made on the assumption that the boot control circuit 410 is separate from the RoT module 420.

Meanwhile, even though the boot control circuit 410 illustrated in FIG. 4 is configured such that the inside thereof is hidden, the result of integrity verification performed by the RoT module 420 may be still vulnerable to malicious manipulation.

For example, it may be assumed that, when the integrity verification result signal generated by the RoT module 420 is 'HIGH', this indicates that integrity verification has succeeded. In this case, an attacker may circumvent the function of verifying the integrity of the first boot firmware by manipulating the integrity verification result signal using hardware such that it is always 'HIGH'.

In order to prevent manipulation of the verification result signal in this way, the present invention proposes the following method.

Here, the control logic 910 may receive a random number sequence corresponding to the integrity verification result from the RoT module, and may determine that integrity verification succeeds when the random number sequence matches a random number sequence for verification.

Here, when integrity verification succeeds, the RoT module may generate and provide a random number sequence that is identical to the random number sequence for verification, whereas when integrity verification fails, the RoT module may generate and provide a random number sequence that is not identical to the random number sequence for verification.

For example, referring to FIG. 5, when verification of the integrity of the first boot firmware stored in the first boot memory 430 succeeds, the RoT module 420 represents an integrity verification result signal using a previously designated random number sequence (a random number sequence that is identical to the random number sequence for verification), rather than 'HIGH', and outputs the same to a verification result signal line, and only when the entirety of the designated random number sequence is input may the control logic of the boot control circuit 410 output a route selection signal and a reset control signal that are set to values for allowing the processor to be booted.

Also, when integrity verification fails, the RoT module 420 may maintain the integrity verification result signal set to 'LOW' and output the same to the verification result signal line, or may output a random number sequence that is randomly generated so as to be different from the previously designated random number sequence to the verification result signal line.

Here, the random number sequence data may be a portion of the control logic of the boot control circuit 410, or may be stored in a hardware damage detection module 440 outside the boot control circuit 410 and read by the control logic when necessary.

As described above, the present invention may be configured such that the RoT module represents an integrity verification result using a previously designated random number sequence and such that the random number sequence to be used for verification is stored in a boot control circuit or a hardware damage detection module, thereby preventing the integrity verification result signal from being manipulated.

Here, the RoT module 420 may notify the user of the embedded device of damage to the first boot firmware, and to this end, a state display function using an LED, an LCD, a serial console terminal, or the like may be provided, as shown in FIG. 4.

Also, the control logic 910 determines whether hardware damage is detected.

Here, whether hardware damage is detected may be determined by referring to a damage detection signal output by a separate hardware damage detection module.

For example, referring to FIG. 4, the control logic of the boot control circuit 410 may acquire a damage detection signal from a hardware damage detection module 440, and may determine that hardware is damaged when the damage detection signal indicates a damaged state.

Here, the hardware damage detection module 440 may determine whether the embedded device according to the present invention is illicitly opened or damaged, and may output the determination result using a damage detection signal.

For example, the hardware damage detection module 440 may include a sealed circuit that is set to be damaged when the embedded device is illicitly opened, and when power is applied to the hardware damage detection module 440, the sealed circuit may output a damage detection signal indicating that the device is damaged. Here, the sealed circuit may be designed such that it cannot be easily restored to the original state once it is damaged.

Here, a random number sequence for verification may be stored in the hardware damage detection module, which provides a hardware damage detection signal based on which the determination of whether hardware is damaged is made, and may be initialized when it is determined based on the hardware damage detection signal that the hardware is damaged.

For example, the hardware damage detection module 440 illustrated in FIG. 4 may include a random number sequence storage and initialization circuit for storing a random number sequence for verification, which is a previously designated random number sequence, and for initializing the stored random number sequence for verification when illicit opening of the embedded device is detected. This circuit may be configured with data storage memory, a switch and sensor for sensing opening, and the like, and may operate with battery power such that it is capable of operating even when external power is not supplied thereto.

Here, the control logic of the boot control circuit 410 illustrated in FIG. 4 may read the random number sequence for verification from the random number sequence storage and initialization circuit of the hardware damage detection module 440, and may control peripheral modules and circuits such that the processor is booted normally only when the random number sequence received from the RoT module 420 matches the random number sequence for verification.

The hardware damage detection module proposed by the present invention may include various functions in addition to the above-described functions, and the specific internal configuration of the module and embodiments thereof are not limited, as long as the functions of detecting illicit opening of and damage to hardware and outputting the result thereof using a signal are provided.

Also, the control logic 910 releases the reset state of the processor and the interrupted state of the connection between the hardware and the boot memory such that the processor is capable of being booted in consideration of the integrity verification result and whether hardware damage is detected.

Here, the control logic 910 may release the reset state of the processor and the interrupted state of the connection between the hardware and the boot memory when integrity verification succeeds in the state in which hardware is not damaged, the state being determined based on whether hardware damage is detected.

Here, when the reset state and the interrupted state are released, the reset state of the processor may be released based on the control logic 910, and switchover from the route from the boot memory to the RoT module to a route from the boot memory to the processor may be performed based on the route switchover device 920.

For example, referring to FIG. 4, the control logic of the boot control circuit 410 may generate a route selection signal to transmit to the route switchover device and a processor reset control signal by referring to the integrity verification result signal output by the RoT module 420 and the damage detection signal output by the hardware damage detection module 440.

Here, when the damage detection signal indicates that there is no damage and when the integrity verification result signal indicates that verification succeeds, a route selection signal for connecting the processor with the first boot memory 430 may be generated, and the processor may be controlled so as to boot the first boot firmware by releasing the reset state of the processor.

That is, when the integrity verification result signal indicates that verification succeeds but when the damage detection signal indicates a damaged state, the route of the boot memory bus may be controlled such that the connection between the first boot memory 430 and the RoT module is maintained, and the reset state may be maintained through a reset control signal so as to prevent the processor from being booted. Through this process, manipulating a signal line by illicitly opening hardware may be prevented.

Here, the control logic of the boot control circuit 410 may alternatively generate a power control signal capable of controlling the power supply of the processor. That is, the control logic may allow or prevent booting of the processor by generating a power control signal based on which control is performed so as to supply power to the processor or to interrupt the supply of power to the processor.

Here, the reset state and the interrupted state are released, whereby the processor of the embedded device may commence booting of the first boot firmware.

For example, referring to FIG. 4, when the boot control circuit 410 releases the reset state of the processor and connects the boot memory bus of the first boot memory 430 to the processor, the processor may boot the first boot firmware stored in the first boot memory 430.

Then, the processor may boot the boot software for a later step stored in the storage device 450. For example, as in the conventional technology illustrated in FIG. 3, after the boot software of the current step completes verification of the integrity of boot software of the next step, it may boot the boot software for the next step and hand over control thereto.

Here, the processor may process an integrity verification algorithm using the function of the cryptographic coprocessor of the RoT module 420, and to this end, the processor may interface with the RoT module 420 through a high-speed JO bus (USB, SDIO, PCIe, or the like).

Also, when integrity verification fails or when hardware damage is detected, the control logic 910 may deliver a boot error message to a user while maintaining the reset state of the processor and the interrupted state of the connection between the processor and the boot memory.

Here, the boot error message may be provided depending on the integrity verification result and on whether hardware damage is detected.

For example, when integrity verification fails, a boot error message indicating that the first boot firmware is damaged and altered may be output.

In another example, when hardware damage is detected, a boot error message indicating that the boot firmware is altered by hardware access may be output.

Here, the boot error message in any of various forms may be output depending on the circumstances, rather than being limited to any one specific form.

Using the above-described boot control circuit using a route switchover function for a boot memory bus, the process of verifying the integrity of the first boot firmware is set as the start point of trust, and trust in integrity is finally extended to applications, whereby reliability of all of the software (including firmware) booted in an embedded device may be secured.

Also, damage to a chain of trust attributable to falsification of the first boot firmware is fundamentally prevented in an embedded device including a processor, whereby secure boot technology capable of ensuring the reliability of the first boot firmware may be provided.

Also, only the switchover function of a boot memory bus and a processor reset control step are added to verified boot technology based on an RoT and a chain of trust, whereby secure boot technology capable of being applied in common to different processors regardless of the types thereof may be provided, because it is simple and is not dependent on technology of a processor manufacturer.

Also, a complete chain of trust for all of the software booted in an embedded device may be built by applying secure boot technology, which starts from verification of the integrity of first boot firmware, to all of the software in the embedded device, and software that is altered for malicious purposes may be prevented from being booted and executed.

According to the present invention, damage to a chain of trust attributable to falsification of first boot firmware may be fundamentally prevented in an embedded device including a processor, whereby secure boot technology capable of ensuring the reliability of the first boot firmware may be provided.

Also, the present invention adds only the switchover function of a boot memory bus and a processor reset control step to verified boot technology based on an RoT and a chain of trust, thereby providing secure boot technology capable of being applied in common to different processors regardless of the types thereof because it is simple and not dependent on technology of processor manufacturers.

Also, the present invention may configure a complete chain of trust for all of the software booted in an embedded device by applying secure boot technology, which starts from verification of the integrity of first boot firmware, to all of the software in the embedded device, and may prevent software that is altered for malicious purposes from being booted and executed.

As described above, the method for secure booting using a route switchover function for a boot memory bus and the apparatus using the same according to the present invention are not limitedly applied to the configurations and operations of the above-described embodiments, but all or some of the embodiments may be selectively combined and configured, so the embodiments may be modified in various ways.

What is claimed is:

1. A method for secure booting, comprising:
    maintaining a reset state in order to prevent a processor of an embedded device from being booted, and interrupting connection between the processor and boot memory;
    verifying an integrity of first boot firmware stored in the boot memory;
    determining whether hardware damage is detected; and
    releasing the reset state and an interrupted state of the connection between the processor and the boot memory in consideration of whether the hardware damage is detected and verification of the integrity in order to allow the processor to be booted,
    wherein interrupting the connection is configured to perform a switchover from a route from the boot memory to the processor to a route from the boot memory to a Root-of-Trust (RoT) module for verifying the integrity,
    wherein the RoT module verifies the integrity using a plurality of public keys for digital signature verification, which is stored in internal OTP memory in which data is not capable of being modified or deleted, a signature value acquired from first boot memory, and a first boot firmware image based on a digital signature verification algorithm, wherein the plurality of public keys comprises a first public key for verifying operation firmware in the RoT module, a second public key for verifying application firmware in the RoT module, a third public key for verifying Basic Input/Output System firmware of the embedded device located outside the RoT module, a fourth public key for verifying integrity of operation of boot loader of the embedded device located outside the RoT module, a fifth public key for verifying integrity of operation of operating system of the embedded device located outside the RoT module, and a sixth public key for verifying integrity of application of the embedded device located outside the RoT module.

2. The method of claim 1, wherein interrupting the connection is configured to generate a reset control signal for resetting the processor using hardware and to transmit the reset control signal to the processor.

3. The method of claim 2, wherein releasing the reset state and the interrupted state is configured to release the reset state of the processor and perform a switchover from the route from the boot memory to the RoT module to the route from the boot memory to the processor.

4. The method of claim 1, wherein verifying the integrity comprises:
    receiving a random number sequence corresponding to an integrity verification result from the RoT module; and
    determining that verification of the integrity succeeds when the random number sequence matches a random number sequence for verification.

5. The method of claim 4, wherein the RoT module is configured to:
    generate and provide a random number sequence that is identical to the random number sequence for verification when verification of the integrity succeeds, and generate and provide a random number sequence that is not identical to the random number sequence for verification when verification of the integrity fails.

6. The method of claim 4, wherein the random number sequence for verification is stored in a hardware damage detection module for providing a hardware damage detection signal based on which whether the hardware damage is detected is determined, and is initialized when it is determined based on the hardware damage detection signal that hardware is damaged.

7. The method of claim 1, wherein the RoT module is securely booted based on its own secure boot mechanism and includes integrity-checking code in nonvolatile memory fixed based on hardware.

8. The method of claim 1, wherein interrupting the connection is performed when power is applied in order to prevent the processor from booting the first boot firmware.

9. The method of claim 1, wherein releasing the reset state and the interrupted state is performed when verification of the integrity succeeds in a state in which hardware is not damaged, the state being determined based on whether the hardware damage is detected.

10. A boot control circuit, comprising:
a route switchover device; and
control logic for maintaining a reset state in order to prevent a processor of an embedded device from being booted, interrupting connection between the processor and boot memory by controlling the route switchover device, verifying an integrity of first boot firmware stored in the boot memory, determining whether hardware damage is detected, and releasing the reset state and an interrupted state of the connection between the processor and the boot memory in consideration of whether the hardware damage is detected and verification of the integrity in order to allow the processor to be booted,
wherein the route switchover device performs a switchover from a route from the boot memory to the processor to a route from the boot memory to a Root-of-Trust (RoT) module for verifying the integrity when the connection between the processor and the boot memory is interrupted,
wherein the RoT module verifies the integrity using a plurality of public keys for digital signature verification, which is stored in internal OTP memory in which data is not capable of being modified or deleted, a signature value acquired from first boot memory, and a first boot firmware image based on a digital signature verification algorithm, wherein the plurality of public keys comprises a first public key for verifying operation firmware in the RoT module, a second public key for verifying application firmware in the RoT module, a third public key for verifying Basic Input/Output System firmware of the embedded device located outside the RoT module, a fourth public key for verifying integrity of operation of boot loader of the embedded device located outside the RoT module, a fifth public key for verifying integrity of operation of operating system of the embedded device located outside the RoT module, and a sixth public key for verifying integrity of application of the embedded device located outside the RoT module.

11. The boot control circuit of claim 10, wherein the control logic generates a reset control signal for resetting the processor using hardware and transmits the reset control signal to the processor.

12. The boot control circuit of claim 11, wherein, when the reset state and the interrupted state are released, the reset state of the processor is released based on the control logic, and a switchover from the route from the boot memory to the RoT module to the route from the boot memory to the processor is performed based on the route switchover device.

13. The boot control circuit of claim 10, wherein the control logic receives a random number sequence corresponding to an integrity verification result from the RoT module, and determines that verification of the integrity succeeds when the random number sequence matches a random number sequence for verification.

14. The boot control circuit of claim 13, wherein the RoT module is configured to:
generate and provide a random number sequence that is identical to the random number sequence for verification when verification of the integrity succeeds, and
generate and provide a random number sequence that is not identical to the random number sequence for verification when verification of the integrity fails.

15. The boot control circuit of claim 13, wherein the random number sequence for verification is stored in a hardware damage detection module for providing a hardware damage detection signal based on which whether the hardware damage is detected is determined, and is initialized when it is determined based on the hardware damage detection signal that hardware is damaged.

16. The boot control circuit of claim 10, wherein the control logic operates when power is applied in order to prevent the processor from booting the first boot firmware.

17. The boot control circuit of claim 10, wherein the control logic releases the reset state and the interrupted state when verification of the integrity succeeds in a state in which hardware is not damaged, the state being determined based on whether the hardware damage is detected.

* * * * *